L. SCHATTERMAN.
LEMON SQUEEZER.
APPLICATION FILED MAY 2, 1913. RENEWED MAY 3, 1915.

1,141,834.  Patented June 1, 1915.

UNITED STATES PATENT OFFICE.

LOUISE SCHATTERMAN, OF MOLINE, ILLINOIS.

LEMON-SQUEEZER.

1,141,834.     Specification of Letters Patent.     Patented June 1, 1915.

Application filed May 2, 1913, Serial No. 765,020. Renewed May 3, 1915. Serial No. 25,631.

*To all whom it may concern:*

Be it known that I, LOUISE SCHATTERMAN, a citizen of the United States, residing at Moline, in the county of Rock Island and State of Illinois, have invented certain new and useful Improvements in Lemon-Squeezers, of which the following is a specification.

This invention relates to improvements in lemon squeezers and its object is to produce a device of this class provided with an extractor having an apertured flared base adapted to rest upon ledges made integral with the body of a container that is separate and apart from the extractor; said base forming a seed retainer.

The invention consists in the combination and arrangement of parts to be hereinafter fully described in the following specification, pointed out in the claims and illustrated in the accompanying drawing which forms a part of said specification and in which—

Figure 1:
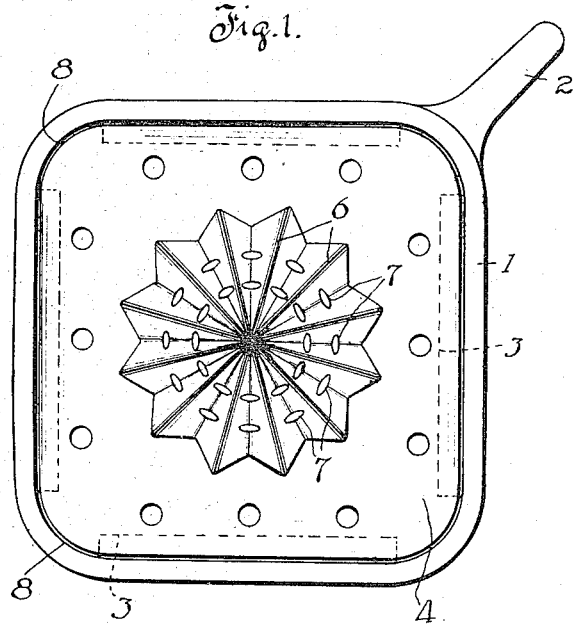
Figure 2:
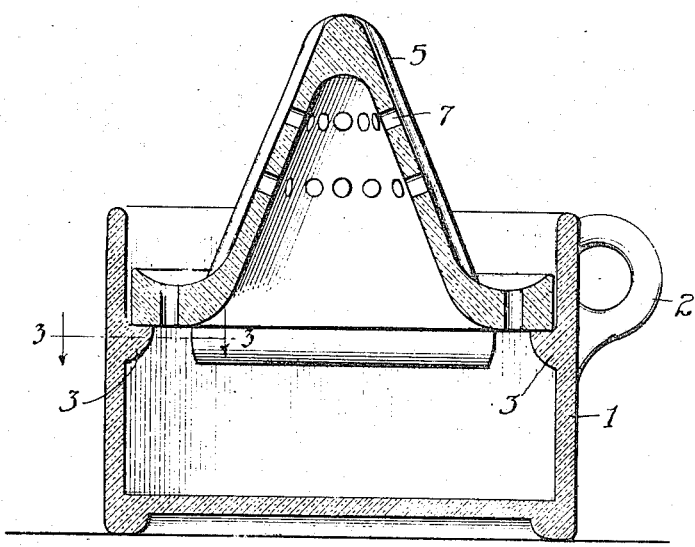
Figure 3:
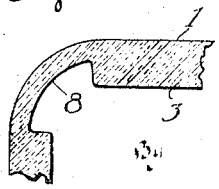

Figure 1 is a plan of my improved lemon squeezer. Fig. 2 is a vertical section in side elevation. Fig. 3 is a section taken on line 3—3 of Fig. 2.

Like reference characters indicate corresponding parts throughout the several views.

1 is the container of approximately square formation in cross section and provided with a handle 2 at one corner. Within the container a plurality of integral ledges 3 are provided upon which the flared apertured base 4 of the extractor 5 is adapted to rest; said extractor being formed with the usual ridges 6 and with apertures 7 through which the juice extracted from the lemon may pass into the receptacle 1. The ledges 3 aforesaid extend along each side of the container almost from corner to corner and between the adjacent corners of two adjacent ledges a space 8 is provided to permit outpour of the juice. The apertures in the flared base of the extractor permit the juice to flow through said base while preventing passage therethrough of the lemon seed. The fact that the extractor is separate and removable from the container makes it easy to clean all parts of the device or to replace one of the parts should it be broken. By the provision of the flared or upwardly curved base 4 the lemon is caused to more closely hug the cone and its edge portion is deflected upwardly so as to offer no resistance to the hand of the presser, by reason of abutting against the base.

What is claimed is:—

1. In a lemon squeezer, a container formed with a plurality of integral ledges spaced apart from each other, a handle for said container and an extractor formed with an integral apertured flared base adapted to be removably seated upon said ledges.

2. In a lemon squeezer, a container formed with a plurality of integral ledges spaced apart from each other, a handle for said container, an extractor normally disposed above said container and a seed retainer formed integral with said extractor and adapted to rest normally upon the aforesaid ledges.

3. In combination, a cup having corners and a handle projecting outwardly of one of the corners so that the corner diagonally opposite said handle will be directly beneath the handle when the cup is tilted thereby, supporting ledges projecting internally of the cup and having their end portions spaced from each at the corners of the cup to provide delivery passages, a conical member having a base seated on the ledges and provided with grating ribs, said member having openings therein and having its base curved upward to cause the lemon to hug the cone when pressed thereon.

In testimony that I claim the foregoing as my own I have hereto affixed my signature in the presence of two subscribing witnesses.

LOUISE SCHATTERMAN.

Witnesses:
   Mrs. F. DREFCHINSKI,
   Mrs. CARL PETERSEN.